United States Patent
Hwang et al.

(10) Patent No.: US 8,179,379 B2
(45) Date of Patent: May 15, 2012

(54) FLAT DISPLAY DEVICE UNIFIED WITH TOUCH PANEL

(75) Inventors: Min Woo Hwang, Gumi-si (KR); Tae Hoon Kim, Yongin-si (KR); Hyeong Dong Kim, Anyang-si (KR)

(73) Assignee: LG Display Co. Ltd., Seoul (KR)

( * ) Notice: Subject to any disclaimer, the term of this patent is extended or adjusted under 35 U.S.C. 154(b) by 646 days.

(21) Appl. No.: 12/256,897

(22) Filed: Oct. 23, 2008

(65) Prior Publication Data

US 2009/0213089 A1 Aug. 27, 2009

(30) Foreign Application Priority Data

Feb. 21, 2008 (KR) .................. 10-2008-0016032

(51) Int. Cl.
*G06F 3/045* (2006.01)
(52) U.S. Cl. ............... 345/174; 345/173; 178/18.01
(58) Field of Classification Search .......... 345/173–179; 178/18.01–18.04
See application file for complete search history.

(56) References Cited

U.S. PATENT DOCUMENTS

| | | | | |
|---|---|---|---|---|
| 4,771,277 A * | 9/1988 | Barbee et al. | ........... | 345/173 |
| 4,775,765 A * | 10/1988 | Kimura et al. | ........... | 345/173 |
| 2003/0112227 A1* | 6/2003 | Hong | ........... | 345/173 |
| 2005/0046622 A1* | 3/2005 | Nakanishi et al. | ........... | 345/173 |
| 2005/0078094 A1* | 4/2005 | Fujii et al. | ........... | 345/173 |
| 2006/0157289 A1* | 7/2006 | Chou | ........... | 178/18.01 |
| 2008/0122802 A1* | 5/2008 | Furuhashi et al. | ........... | 345/174 |

* cited by examiner

*Primary Examiner* — Kimnhung Nguyen
(74) *Attorney, Agent, or Firm* — Brinks Hofer Gilson & Lione

(57) ABSTRACT

A flat display device unified with a touch panel which is adaptive to improve its reliability is disclosed. The flat display device unified with touch panel includes: a liquid crystal display panel having a color filter substrate and a thin film transistor substrate; and the touch panel disposed on the liquid crystal display panel. The touch panel includes: an upper sheet extended to oppose to a driver area of the liquid crystal display panel; a first transparent conduction film formed on the upper sheet; a second transparent conduction film formed on the color filter substrate of the liquid crystal display panel; and a connector connected to the upper sheet.

6 Claims, 3 Drawing Sheets

FLAT DISPLAY DEVICE UNIFIED WITH TOUCH PANEL

CROSS-REFERENCE TO RELATED APPLICATION

This application claims priority under 35 U.S.C. 119 to Korean Patent Application No. 10-2008-0016032, filed on Feb. 21, 2008, which is hereby incorporated by reference in its entirety.

BACKGROUND

1. Field of the Disclosure

This disclosure relates to a flat display device unified with a touch panel which is adaptive to improve their reliability.

2. Description of the Related Art

Touch panels have been used mainly in manufacturing systems, game appliances, KIOSKs, POSes, medical equipments, and so on, instead of input devices such as keyboard and mouse. The touch panel is mounted to the display screen of an output device and allows users to input data in a variety of ways in such a manner that the user views image information on the display screen of the output device and directly presses designated positions on the display screen.

The touch panels are classified into capacitive type, resistive type, and so on. The capacitive touch panels repeatedly charge and discharge electric-charges to one transparent conduction film or glass, and enable an arbitrary quantity of electric-charges to be stored at a contact point on the film or glass contacted with a stylus which is shaped like a pen. The stored electric-charge quantity at the contact point depends on a coupling capacitance of the stylus and the transparent conduction film or glass. Also, the capacitive touch panels read out the stored electric-charges at the contact point through four input nodes and derive coordinates from those. In these capacitive touch panels, electric power must be applied to the stylus.

The resistive touch panels apply a voltage between two conduction layers facing each other, read out a voltage or current variation at a contact point at which the conduction layers come into contact with each other when pressed by the user, and then derive x and y coordinates from the voltage or current variation. In order to read out the voltage or current variation, the resistive touch panels include electrodes such as bus-bars. The flat display devices. including the resistive touch panels, can also be classified into a touch panel-unification type and a touch panel-addition type according to the manner in which the touch panel is combined with the display device.

The flat display device unified with the resistive touch panel will now be described in detail with reference to accompanying drawings. FIG. 1 is a plane view of a flat display device unified with a resistive touch panel according to the related art. FIG. 2 is a cross sectional view showing a flat display device with a touch panel taken along line I-I' in FIG. 1.

Referring to FIGS. 1 and 2, the flat display device, unified with the touch panel according to the related art, includes a liquid crystal display panel 10 displaying an image (or a picture), a touch panel 20 disposed on the liquid crystal display panel 10, and a printed circuit board (PCB) 30 which is loaded with a drive portion that drives the liquid crystal display panel 10 and the touch panel 20. Although it is not shown in the drawings, polarizer films dispersing lights are disposed on the upper and lower surfaces of the liquid crystal display panel 10.

The liquid crystal display panel 10 includes a color filter substrate 10a and a thin film transistor substrate 10b which are combined in the center of a liquid crystal layer 10c interposed therebetween. In the thin film transistor substrate 10b, gate lines 12 receiving scan signals from the exterior and data lines 15 receiving data signals are formed to cross each other. The thin film transistor substrate 10b includes a gate driver 13 at one ends of the gate lines 12, and a data driver 16 at one ends of the data lines 15. The color filter substrate 10a and the thin film transistor substrate 10b are combined with each other by means of a sealant 17 disposed on their edges.

The touch panel 20 includes a resistive sheet 23 formed from a transparent material and functioning a resistive film, a first transparent conduction film 24 formed on the lower surface of the resistive sheet 23, a second transparent conduction film 26 formed on the upper surface of the color filter substrate 10a, and spacers 25 constantly separating the resistive sheet 23 and the color filter substrate 10a from each other by a fixed distance.

In this manner, the liquid crystal display panel 10 and the touch panel 20 are independently configured. Due to this, a first malleable circuit substrate 11 connected to the liquid crystal display panel 10 and a second malleable circuit substrate 21 are included, in order to drive the liquid crystal display panel 10 and the touch panel 20. These first and second malleable (or flexible) circuit substrates 11 and 21 are connected to second and third connectors 31 and 33 on the drive PCB 30, respectively. The drive PCB 30 includes a control integrated circuit (IC) chip, a power supply portion, several wiring patterns, and so on, which are used for driving the liquid crystal display panel 10 and the touch panel 20 to interact with each other.

However, since the contact area (width) d1 of the first connector 22 and the touch panel 20 is narrowed, the flat display device unified with the touch panel according to the related art deteriorates the reliability of electric connection between the first connector 22 and the touch panel 20. Moreover, there is a problem in that a connection defect between the touch panel 20 and the first connector 22 is frequently caused by impacts which are capable of being generated during assembly of the flat display device unified with the touch panel, for example, by shaking generated upon feeding of the flat panel device.

SUMMARY

A flat display device unified with touch panel includes: a liquid crystal display panel having a color filter substrate and a thin film transistor substrate; and the touch panel disposed on the liquid crystal display panel. The touch panel includes: an upper sheet extended to oppose to a driver area of the liquid crystal display panel; a first transparent conduction film formed on the upper sheet; a second transparent conduction film formed on the color filter substrate of the liquid crystal display panel; and a connector connected to the upper sheet.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
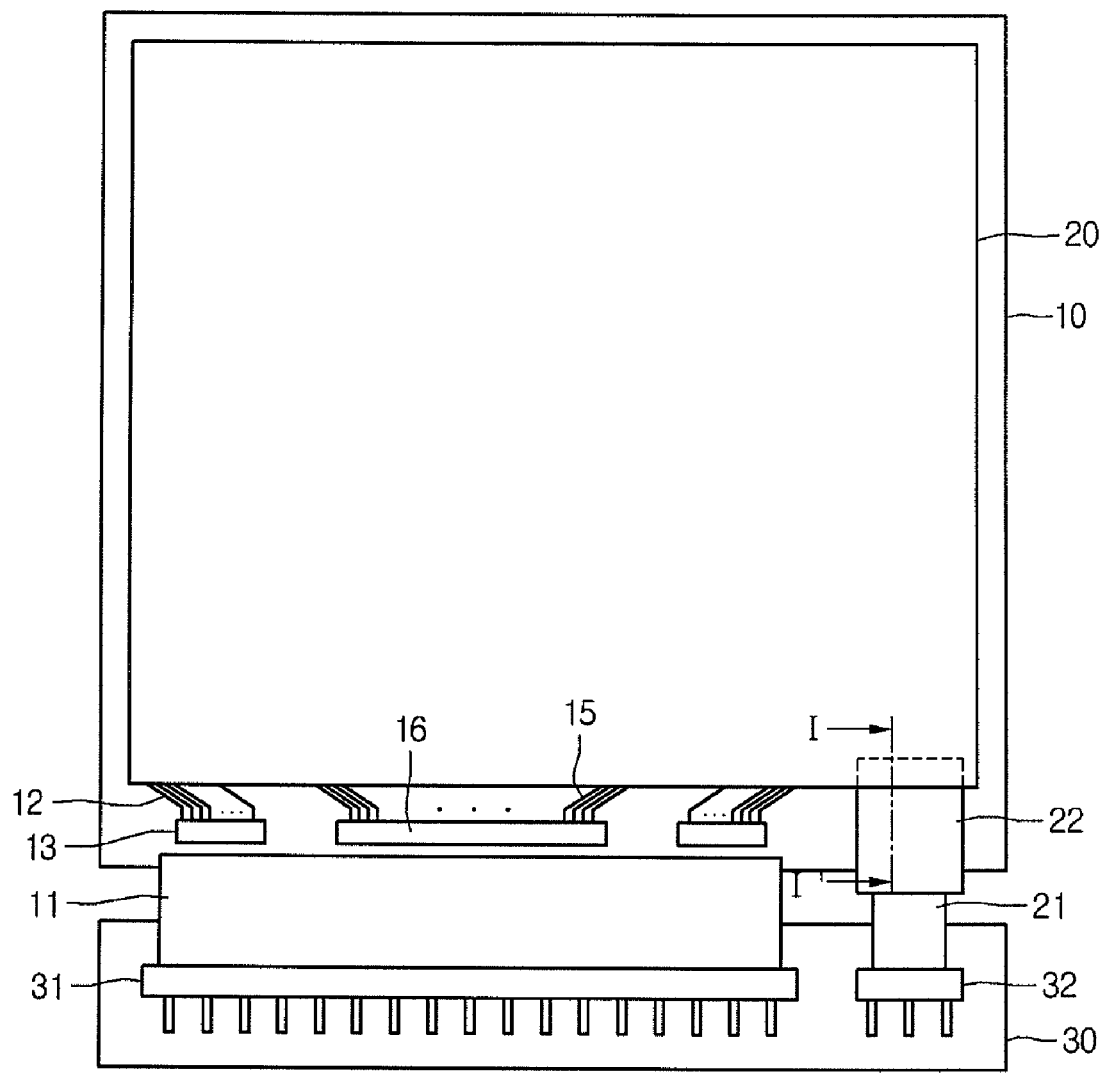
FIG. 1 is a plane view of a flat display device unified with a touch panel according to the related art.
Figure 2:
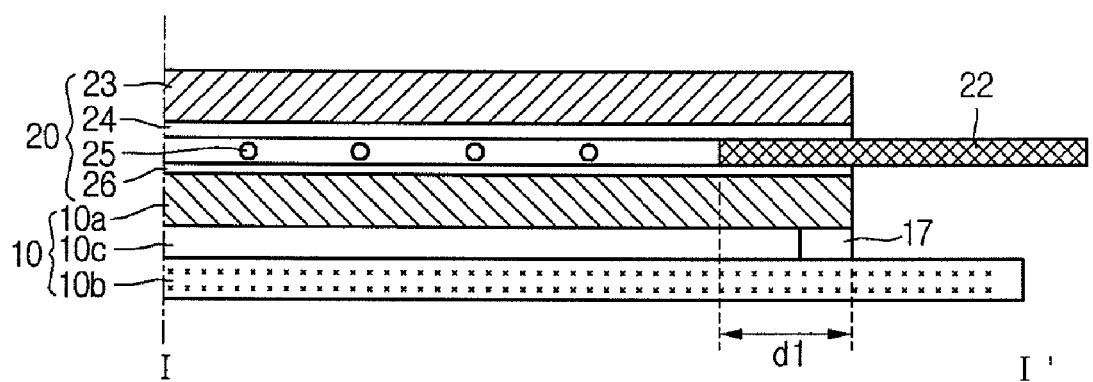
FIG. 2 is a cross sectional view of a flat display device unified with a touch panel taken along line I-I' in FIG. 1.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 3:
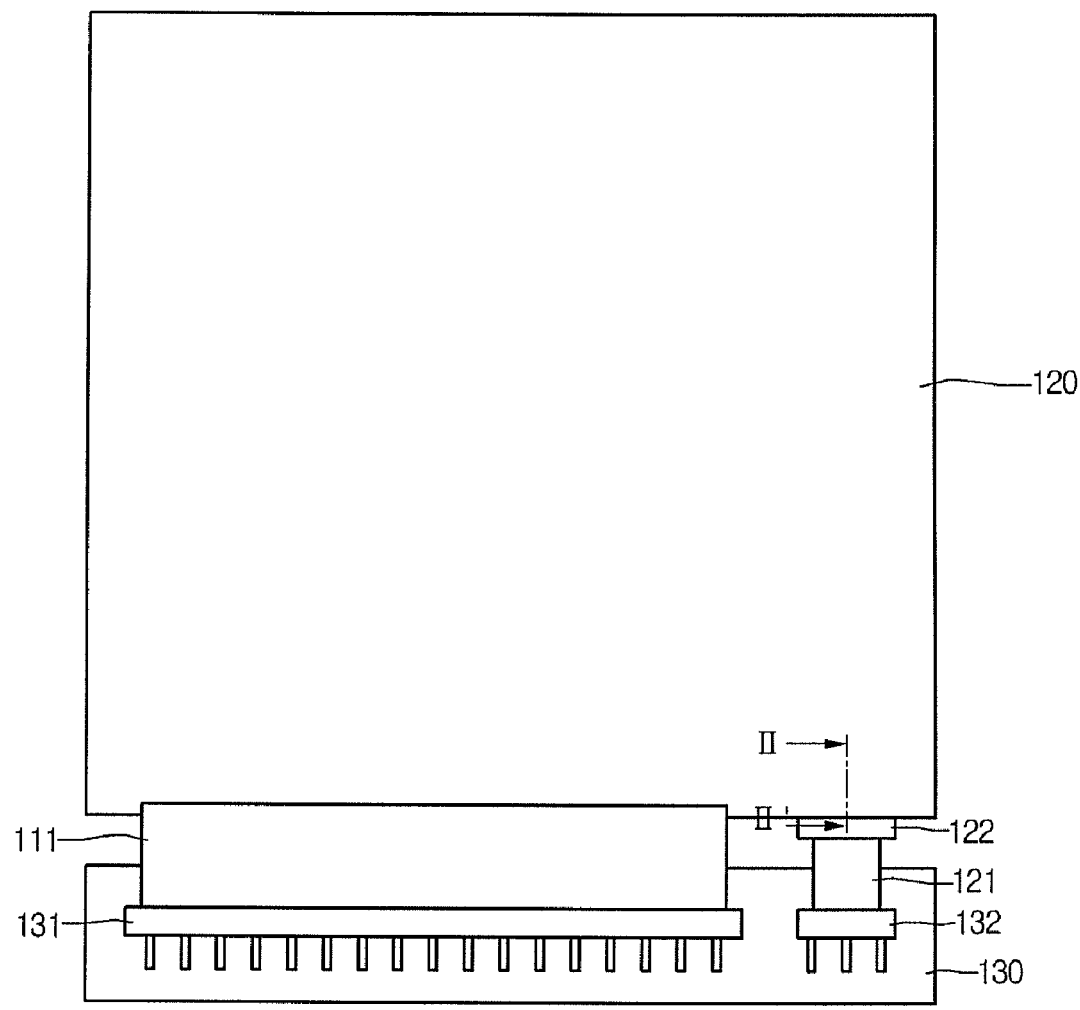
FIG. 3 is a plane view showing a flat display device unified with a touch panel, according to an embodiment of the present disclosure.
Figure 4:
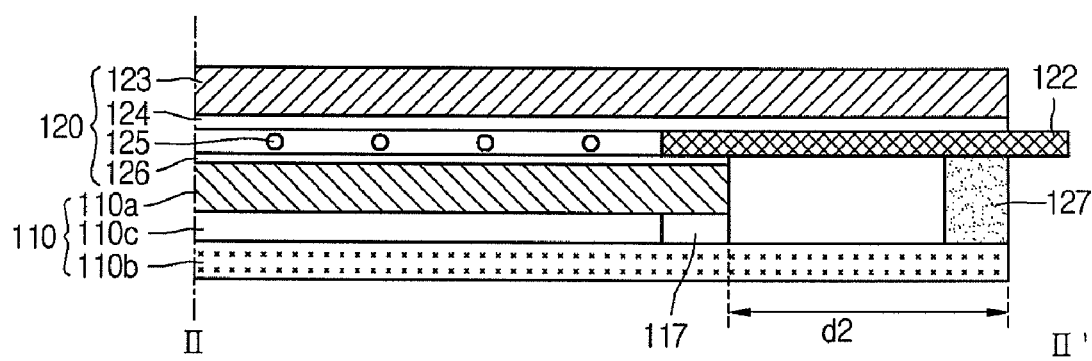
FIG. 4 is a cross sectional view showing a flat display device unified with a touch panel taken along line II-II' in FIG. 3.

FIG. 3 is a plane view showing a flat display device unified with a touch panel, according to an embodiment of the present disclosure. FIG. 4 is a cross sectional view showing a flat display device unified with a touch panel taken along line II-II' in FIG. 3. As shown in FIGS. 3 and 4, the flat display device unified with the touch panel according to the embodiment of the present disclosure includes a liquid crystal display panel 110 displaying an image (or a picture), a touch panel 120 disposed on the liquid crystal display panel 110, and a drive PCB 130 loaded with a drive portion which applies driving signals to the liquid crystal display panel 110 and the touch panel 120.

The liquid crystal display panel 110 includes a color filter substrate 110a and a thin film transistor substrate 110b facing each other, and a liquid crystal layer 110c formed between the color filter substrate 110a and the thin film transistor substrate 110b. The color filter substrate 110a and the thin film transistor substrate 110b are combined by a sealant 117 on their edges.

Although not shown in the drawings, gate lines and data lines are formed to cross each other on the thin film transistor substrate 110b, and thin film transistors TFT are formed on intersecting regions of the gate line and the data lines. Each of the thin film transistors TFT includes a gate electrode connected to a corresponding gate line, a source electrode connected to a corresponding data line, and a drain electrode connected to a pixel electrode of a corresponding liquid crystal cell.

On a side area of the thin film transistor substrate 110b, a driver IC (not shown) is loaded. The driver IC includes a gate driver (not shown) applying scan signals to the gate lines, and a data driver (not shown) applying data signals to the data lines. More specifically, the gate and data drivers respond to control signals from a timing controller (not shown) which is loaded on the drive PCB 130, and apply the scan signals and the data signals to the gate lines and the data lines. To this end, the gate and data drivers of the liquid crystal display panel 110 are electrically connected to a first malleable (or flexible) circuit substrate 111. The first malleable (or flexible) circuit substrate 111 is electrically connected to the drive PCB 130 through a second connector 131 loaded on the drive PCB 130.

The color filter substrate 110a includes color filters which are formed on the regions opposed to the liquid crystal cells.

The touch panel 120 includes a upper sheet 123 formed from a polyethylene terephthalate film, a first transparent conduction film 124 formed on a part of the lower surface of the upper sheet 123, a second transparent conduction film 126 formed on a surface (i.e., the upper surface) of the color filter substrate 110a, and spacers 125 scattered between the first and second transparent conduction films 124 and 126. Herein, the formation of the second transparent conduction film 126 directly on the color filter substrate 110a makes it possible for the flat display device, including the touch panel 120, to be slim. These first and second transparent conduction films 124 and 126 may be formed from one of indium-tin-oxide ITO, indium-zinc-oxide IZO, and indium-tin-zinc-oxide ITZO.

On the edges of the first and second transparent conduction films 124 and 126, electrode bars (not shown in the drawings) are formed. The electrode bars on the edges of the first and second transparent conduction films 124 and 126 are short-circuited and generate a touch detection signal, when the upper sheet 123 is pressed by a finger or a stylus. The touch detection signal has a current or a voltage which varies according to the pressed position on the upper sheet 123.

The upper sheet 123 of the touch panel 120 is extended to the area where the driver IC is positioned, on the thin film transistor substrate 110b. In other words, one end of the upper sheet 123 corresponds to the end of the driver area of the thin film transistor substrate 110b.

A first connector 122 is provided on an edge of the first transparent conduction film 124 formed on the upper sheet 123. The first connector 122 is in contact with the first transparent conduction film 124 and electrode bar of the upper sheet 123 and is electrically connected to a second malleable (or flexible) circuit substrate 121. The contact area of the first connector 122 and the upper sheet 123 can be wider than the one of the related art, because the upper sheet is extended to the end of the driver area of the thin film transistor substrate 110b. The second malleable (or flexible) circuit substrate 121 is electrically connected to the drive PCB 130 through a third connector 132 on the drive PCB 130.

An insulation member 127 is disposed on the upper surface of the thin film transistor substrate 110b, which is opposed to the lower surface of the first connector 122. The insulation member 127 has a fixed elasticity and intensifies the combining force of the first connector 122 and the upper sheet 123. The insulation member 127 is in face-contact with the lower surface of the first connector 122 as well as with the upper surface of the thin film transistor substrate 110b.

In this manner, the flat display device unified with the touch panel has been described as a flat display device including a resistive touch panel, but that is not limited to this. In other words, the flat display device of the present embodiment can be applied to a flat display device that includes a capacitive touch panel.

As described above, the flat display device unified with the touch panel according to the embodiment of the present disclosure extends (or expands) the upper sheet 123 of the touch panel 120 to the driver area of the thin film transistor substrate 110b and is wider the contact area of the first connector 122 and the upper sheet 123. Accordingly, the combining force between the first connector 122 and the upper sheet 123 is intensified. This can result in improved reliability of the flat display device unified the touch panel.

Moreover, the flat display device unified with the touch panel according to an embodiment of the present disclosure further includes the insulation member 127 between the first connector 122 and the upper sheet 123, thereby further intensifying the combining force of the first connector 122 and the upper sheet 123. Therefore, the flat display device unified with the touch panel can improve the reliability.

It will be apparent to those skilled in the art that various modifications and variations can be made in the present disclosure. Thus, it is intended that the present disclosure cover the modifications and variations of this embodiment provided they come within the scope of the appended claims and their equivalents.

What is claimed is:

1. A flat display device unified with a touch panel, comprising:
    a liquid crystal display panel comprising a thin film transistor substrate which has a driver area disposed in a side thereof and a color filter substrate which is faced with the thin film transistor substrate and exposes the driver area; and
    the touch panel disposed on the liquid crystal display panel and comprising:
    a second transparent conduction film formed on the color filter substrate and exposing the driver area;
    a first transparent conduction film facing the second transparent conduction film;
    an upper sheet on the first transparent conduction film, and the upper sheet extended to the driver area of the thin film transistor substrate to be disposed over the driver area; and
    a connector connected to the first transparent conduction film.

2. The flat display device claimed as claim 1, wherein the connector is in face contact with the upper sheet corresponded to the driver area of the thin film transistor substrate.

3. The flat display device claimed as claim 1, wherein an end of the upper sheet corresponds to an end of the driver area of the thin film transistor substrate.

4. The flat display device claimed as claim 1, further comprising an insulation member between the connector and the thin film transistor substrate.

5. The flat display device claimed as claim 4, wherein the insulation member has a fixed elasticity.

6. The flat display device claimed as claim 4, wherein the insulation member is in face contact with both the connector and the thin film transistor substrate.

* * * * *